Feb. 13, 1968     T. A. PELSUE     3,368,289
AIR DRYER JACKET FOR UNDERGROUND ELECTRICAL CABLES
Filed July 26, 1965     2 Sheets-Sheet 1

INVENTOR.
THURMAN A. PELSUE
BY
ATTORNEYS

Feb. 13, 1968 T. A. PELSUE 3,368,289
AIR DRYER JACKET FOR UNDERGROUND ELECTRICAL CABLES
Filed July 26, 1965 2 Sheets-Sheet 2

INVENTOR.
THURMAN A. PELSUE
BY
ATTORNEYS

United States Patent Office 3,368,289
Patented Feb. 13, 1968

3,368,289
AIR DRYER JACKET FOR UNDERGROUND
ELECTRICAL CABLES
Thurman A. Pelsue, 3706 S. Hibiscus Way,
Denver, Colo. 80237
Filed July 26, 1965, Ser. No. 474,816
9 Claims. (Cl. 34—232)

ABSTRACT OF THE DISCLOSURE

The invention consists of a dryer jacket for use in splicing underground electrical cable which includes a wraparound fabric jacket having means for sealing said jacket around the cable whereby, as forced hot air is introduced into the jacket, the jacket will inflate around the cable and provide an envelope of warm circulating air.

---

This invention relates to a dryer jacket and, more specifically, to a device of the type aforementioned specifically designed for attachment to an underground cable to dry same out preparatory to making a splice or other repair.

Most urban areas are honeycombed with tunnels containing water and gas lines, electrical cables and sewer lines. These tunnels are usually quite damp and often have standing water lying in the bottom thereof resulting from seepage. Working in such an environment is uncomfortable, to say the least, and efforts are usually made to control the temperature of the air as well as dry it out whenever possible. More important, however, is to provide the workmen with a supply of fresh air from the surface which will sweep out any noxious gases as well as insure them of an adequate and healthful atmosphere within which to work.

Portable ventilating heaters are customarily employed by the utilities companies for this purpose and an example of such a unit can be found in U.S. Patent No. 2,811,962 of which I am a co-inventor. These devices draw in outside air, pass it over a heat exchanger and blow the heated air into the subsurface installation by means of a large-diameter flexible conduit. Thus, a source of heated air is almost always available to the workmen making repairs and installations underground.

Water, sewer and natural gas lines present no particular problem insofar as moisture is concerned; however, underground electrical cables can be severely damaged if the water-repellent sheathing becomes broken or otherwise damaged and allows water to soak the wires and insulation covering same. When this occurs, it is necessary to dry the cable out thoroughly before making the splice or other needed repair; otherwise, the moisture will be trapped inside the water-tight sheath where it can cause considerable damage.

It has now been found in accordance with the teaching of the instant invention that drying the cable can be handled simply and speedily by encasing the damaged area in a novel jacket which, when connected to the available source of hot dry air, will quickly remove any water therefrom. The jacket is so designed that it need not be slipped over a free end, but rather, can be wrapped around the damaged area at any point throughout its length. Openings are provided in the bottom of the jacket to allow the moisture-laden air and condensate to escape therefrom. The ends are equipped with simple strap ties which are readily adjusted to accommodate any different size cable. Means are even provided for hanging the jacket on some available overhead support so as to enable the heated air to circulate freely around the damaged area.

The material from which the jacket is formed is water-repellent and, preferably, both heat-resistant and waterproof. It folds readily into a small compact package easily stored on the service truck. The length of the jacket is such as to dry the cable a considerable distance on both sides of the break where water may well have seeped or been drawn by capillary action. Installation and removal are simple and fast as no tools are required to perform either operation. The collar which attaches to the blower hose is, likewise, simple and of standard dimension.

It is, therefore, the principal object of the present invention to provide a novel wrap-around jacket for introducing heated air onto wet conductors and the like to dry them out preparatory to making the necessary repairs.

A second object is the provision of a device of the type above-described which is designed to be fastened intermediate the extremities of an elongate member that needs to be dried out.

Another objective of the invention herein disclosed and claimed is the provision of an air-dryer jacket specifically designed for use in subsurface installations in combination with a portable forced-air ventilating heater located above ground.

Still another object is to provide a hot-air jacket including means for exhausting the moisture-laden air and condensate away from the article being dried.

An additional objective is the provision of a forced-air heater accessory that can be adjusted to accommodate any of the common sizes of electrical conduit and will encase a considerable length thereof adjoining a damaged area.

Further objects are to provide a heater jacket that is simple, inexpensive, versatile, rugged, compact, and decorative in appearance.

Other objects will be in part apparent and in part pointed out specifically hereinafter in connection with the description of the drawings that follows, and in which.

Figure 1:
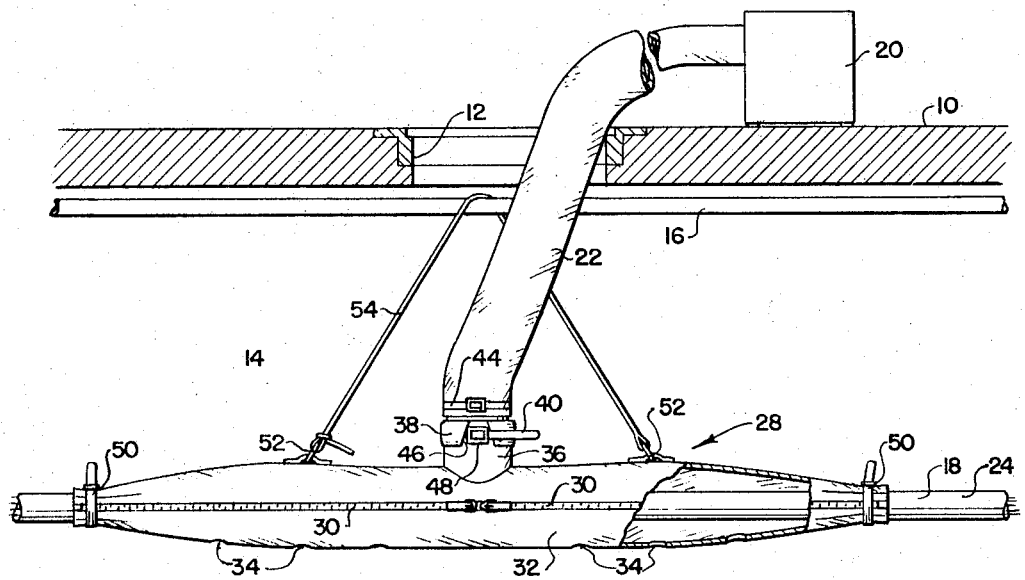
FIGURE 1 is an elevation of the hot-air jacket in place on a subsurface electrical conductor with a forced air ventilating heater mounted above ground delivering hot air thereto, the roadway together with portions of the jacket having been shown in section while the heater has been reduced in size and represented schematically.

Referring now to the drawings for a detailed description of the present invention and, initially, to FIGURE 1 for this purpose, reference numeral 10 represents a roadway or the like having a manhole 12 therein through which access is provided to an underground utilities tunnel 14 containing lines 16 that carry water and natural gas along with multi-conductor electrical cables 18. These utilities tunnels 14 customarily contain many such pipes and electrical cables and may, under certain conditions, also contain sewage either confined to a sewer line or running free in the bottom thereof. In any event, the atmosphere within such a tunnel is quite humid due to seepage under such conditions as those just mentioned.

For the sake of simplicity and clarity of illustration, only one pipe and cable have been shown, it being understood that many such utilities would ordinarily be present.

Above-ground is mounted a forced air ventilating heater shown schematically in FIGURE 1 and identified by reference numeral 20. This unit provides a continuous flow of dry heated air that emerges from the heater and is conducted underground through flexible duct or hose 22 that passes down through the open manhole 12. Ordinarily, these units are used to provide a continuous supply of fresh air to those working in the tunnel as well as sweeping any noxious gases therefrom. In cold weather, they heat the working area and make it more comfortable for the workmen. In summer the burners are turned off when the unit is used for ventilating.

Now, when a break or rupture occurs in the sheath or outer water-proof covering 24 of cable 18, the moist tunnel air quickly invades the insulation of the several conductors and can seriously damage same. Wet conductors are also more difficult to solder and perform other operations upon which are necessary to repair them. Therefore, it becomes necessary to dry out the conductors thoroughly before making the necessary repairs.

Figure 3:
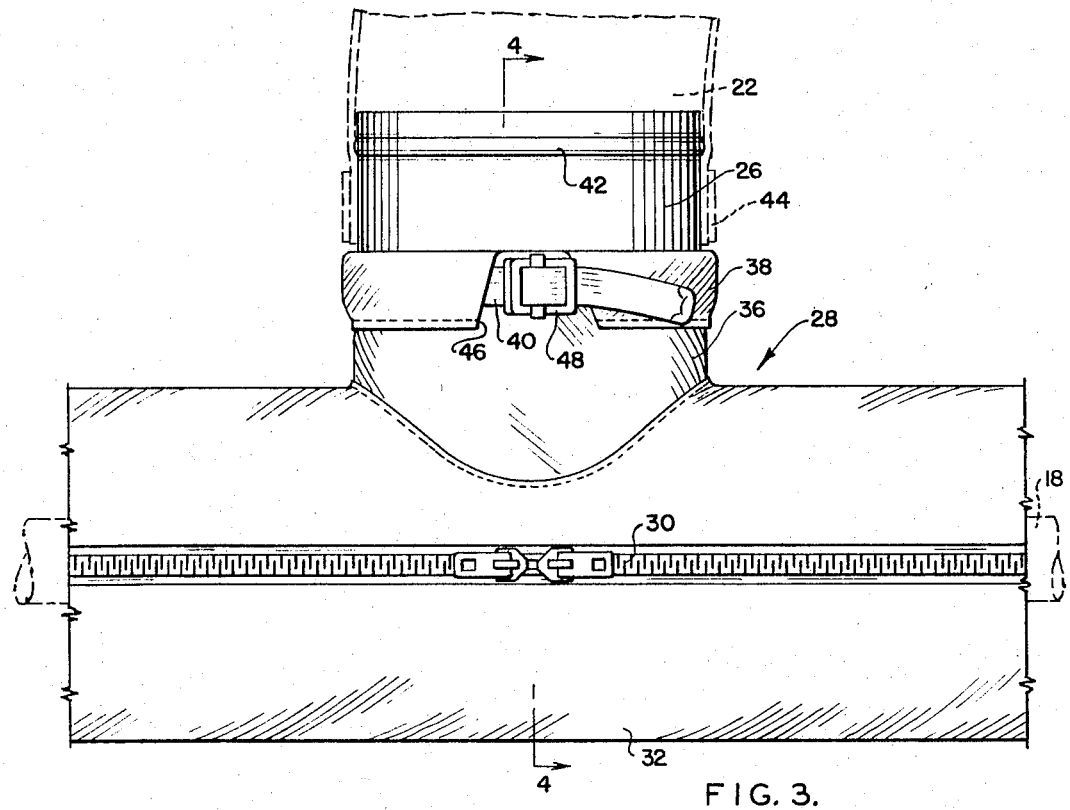
FIGURE 3 is an enlarged elevation of the center section of the jacket showing the zippers and manner of fastening the collar to the tubular hose connector; and, FIGURE 4 is a section taken along line 4—4 of FIGURE 3.
Figure 4:
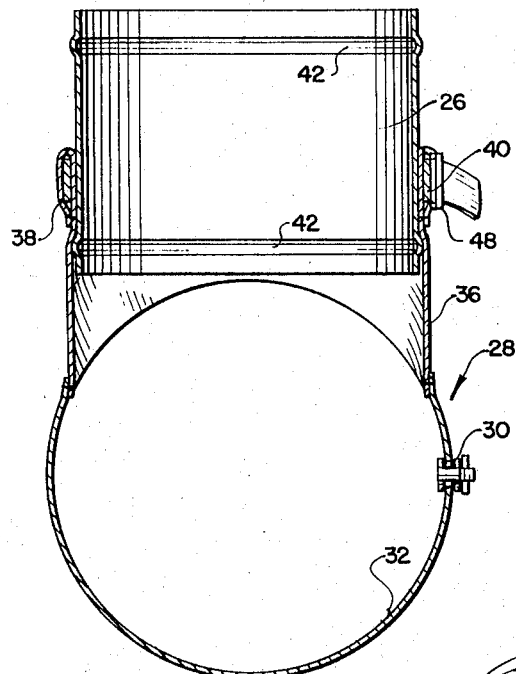

To do so, ventilating heater 20 is started up and the burners ignited. Hot air duct 22 is connected to the outlet and run down through the manhole into the tunnel 14 to the side of the break in the cable. A rigid tubular connector 26 (FIGURES 3 and 4) is fastened into the outlet of duct 22 with a portion thereof projecting there-beyond to be fastened to the jacket.

The jacket which forms the subject matter of the instant invention has been designated in a general way by reference numeral 28 and will now be described in detail in connection with all four figures of the drawings. As shown most clearly in FIGURE 2, the jacket 28 is formed from an elongate rectangular sheet of heat and water-resistant foldable plastic material having zippers 30 provided along the side margins which, when brought together and closed, produce a generally tubular body 32. Of course, the interlocking halves of the zipper track are fastened on opposite side edges of the body-forming sheet. In the particular form shown, two zippers 30 are used, each extending in opposite directions from the middle of the body to facilitate fastening the jacket in place. The zippers are rust-proof and of the heavy-duty type commonly used on such items as sleeping bags and tents.

The material from which the jacket is fabricated must be able to withstand the air temperatures developed by the ventilating heater which presents no problem. As for moisture-resistance, a material that is not damaged by water is, of course, necessary although it needn't be impervious thereto. Even a material such as canvas will suffice for purposes of the present invention although it will soak up the water released from the cable and use up some of the hot dry air from the ventilating heater to dry out the jacket. Hence, a plastic material that will not soak up water is preferred and a plurality of openings 34 are provided in the bottom of the body to permit the air and condensate to escape from the jacket. These drain and exhaust holes are preferably displaced slightly toward the ends of the jacket so that the incoming heated air will be forced to circulate along the damaged cable 18 awhile before being permitted to leave the jacket.

Intermediate the ends of the body 32 and in the top center thereof is sewn an upstanding tubular collar 36 through which the hot dry air is introduced into the jacket. The free upper edge of this collar is folded over and sewn to produce a hem 38 through which strap 40 is threaded that fastens said collar onto connector 26. The connector 26 is preferably provided with a pair of circumferential ribs 42 adjacent opposite ends thereof that cooperate with the straps 40 and 44 (FIGURE 3) to keep both the duct 22 and jacket 28 fastened thereto. An opening 46 is provided in the hem to provide access to the buckle 48.

Figure 2:
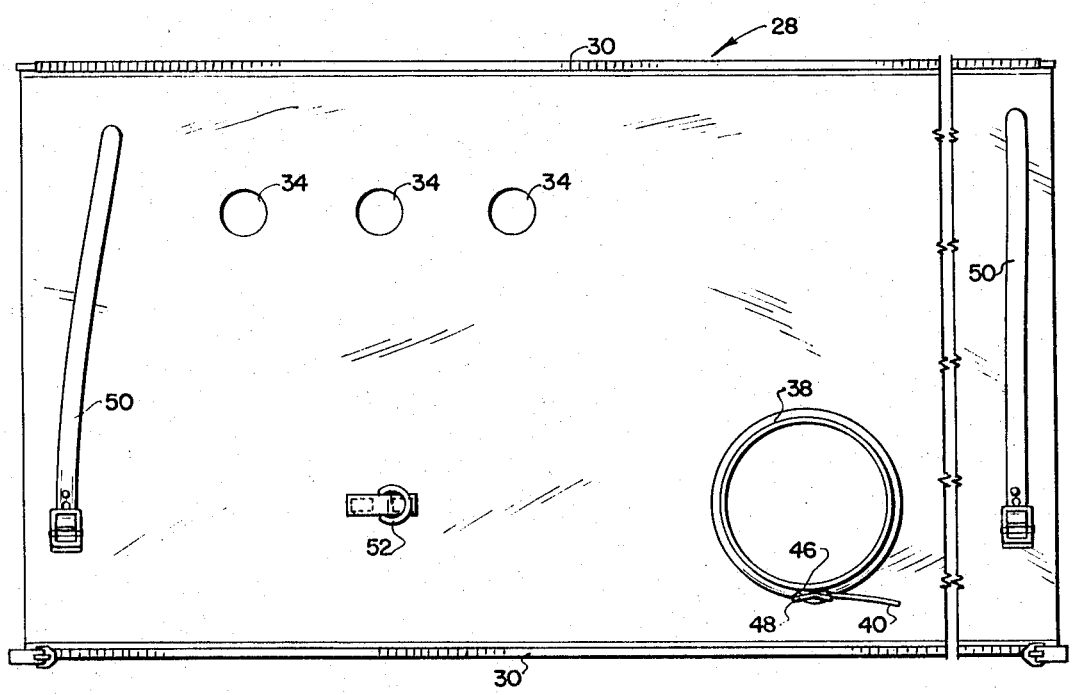
FIGURE 2 is a plan view of the jacket alone to an enlarged scale, portions thereof having been broken away to conserve space.

Next, with particular reference to FIGURES 1 and 2, it will be seen that opposite ends of the body 32 are provided with transversely extending straps 50 on the outside thereof. The latter straps wrap around the ends of the body and pull same up snug against the cable 18, whereupon, they are buckled to prevent air from escaping through the ends. The length of straps 50 is selected to accommodate cables of varying diameters.

The foregoing produces an elongated bag that envelops the damaged portion of the cable and confines the hot dry air which is fed thereto by the ventilating heater. In a relatively short time, the cable will dry out sufficiently to enable the necessary repairs to be made.

The only other feature that remains to be described are the grommets 52 provided on the top of the jacket in spaced relation on opposite sides of the collar 36. In some instances, the air pressure developed inside the jacket may be insufficient to "balloon" same up out of contact with the cable. When this occurs, air cannot circulate effectively over the top of the cable and drying will be thus impeded. Accordingly, grommets 52 provide means for attaching a lanyard 54 (FIGURE 1) that can be strung over a convenient overhead support such as, for example, pipe 16 to hold the top of the jacket out of contact with the cable. This feature may not be needed in instances where the ventilating heater develops sufficient air pressure to "balloon" the jacket; however, they are a useful adjunct to the jacket.

Having thus described the several useful and novel features of my air-dryer jacket for underground cables and the like, it will be apparent that the several worthwhile objectives for which it was designed have been achieved. Although but a single specific embodiment of the invention has been illustrated and described herein, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. An air dryer jacket, adapted to enclose a damaged section of electrical cable or the like to dry same out when connected to a forced air heater which comprises: an elongate generally rectangular sheet of foldable heat and moisture resistant material of a width adapted to envelop the damaged area of the cable in spaced relation thereto, fastener means carried on opposite side margins of the sheet for releasably joining said margins together to form an elongate tubular body, second fastener means positioned on opposite ends of the tubular body extending circumferentially thereof, said second fastener means being adapted to close the ends of the body around the cable and prevent the hot air from escaping through said ends, and a tubular collar located intermediate the ends of the body communicating the interior thereof, said collar being adapted for connection to a hot air duct delivering hot dry air thereto from the forced air heater.

2. The air dryer jacket as set forth in claim 1 in which: the body includes at least one opening in the underside thereof for the purpose of exhausting air and condensate from the jacket.

3. The air dryer jacket as set forth in claim 1 in which: the first fastener means comprise zippers.

4. The air dryer jacket as set forth in claim 1 in which: the second fastener means comprise straps fitted with buckles.

5. The air dryer jacket as set forth in claim 1 in which: a pair of grommets are provided on the top of the body on opposite sides of the collar, said grommets providing means for suspending the jacket from an overhead support.

6. The air dryer jacket as set forth in claim 1 in which: a rigid tubular connector is mounted inside the collar, said connector being adapted to fasten to the outlet of the hot air delivery duct.

7. The air dryer jacket as set forth in claim 2 in which: the body is provided with at least two exhaust openings located on opposite sides of the midpoint thereof in position such that the incoming air is forced to circulate toward said ends before escaping.

8. The air dryer jacket as set forth in claim 6 in which: the collar has the upper free margin thereof folded over and fastened to form a hem, and a strap and buckle fastener is mounted in the hem adapted to draw said collar tightly against the connector.

9. The air dryer jacket as set forth in claim 8 in which: the rigid tubular connector includes an annular rib encircling the lower extremity thereof below the hem in the collar.

References Cited

UNITED STATES PATENTS

| | | | |
|---|---|---|---|
| 1,833,704 | 11/1931 | Bins | 138—107 |
| 1,835,922 | 12/1931 | Zeiss et al. | 174—25 |
| 2,100,639 | 11/1937 | Doolittle et al. | 34—107 X |
| 2,706,988 | 4/1955 | Weber. | |
| 2,731,944 | 1/1956 | Francis | 34—107 X |
| 2,908,744 | 10/1959 | Bollmeier | 174—92 X |
| 2,930,835 | 3/1960 | Bollmeier | 174—92 X |
| 3,187,090 | 6/1965 | Edwards | 174—92 X |

FREDERICK L. MATTESON, JR., *Primary Examiner.*

C. R. REMKE, *Assistant Examiner.*